(12) United States Patent  
Ding et al.

(10) Patent No.: US 12,416,414 B2
(45) Date of Patent: Sep. 16, 2025

(54) LOCKING DEVICE AND FOOD PROCESSOR

(71) Applicant: PANASONIC KITCHEN APPLIANCES TECHNOLOGY (JIAXING) CO., LTD., Jiaxing (CN)

(72) Inventors: Jieming Ding, Shanghai (CN); Yijie Han, Shanghai (CN)

(73) Assignee: PANASONIC KITCHEN APPLIANCES TECHNOLOGY (JIAXING) CO., LTD., Jiaxing (CN)

( * ) Notice: Subject to any disclaimer, the term of this patent is extended or adjusted under 35 U.S.C. 154(b) by 233 days.

(21) Appl. No.: 18/180,477

(22) Filed: Mar. 8, 2023

(65) Prior Publication Data

US 2023/0304673 A1    Sep. 28, 2023

(30) Foreign Application Priority Data

Mar. 9, 2022  (CN) .......................... 202220509297.4

(51) Int. Cl.
| | |
|---|---|
| *F24C 15/02* | (2006.01) |
| *A47J 36/00* | (2006.01) |
| *E05B 13/00* | (2006.01) |
| *E05B 17/00* | (2006.01) |
| *E05B 63/18* | (2006.01) |
| *E05B 65/00* | (2006.01) |

(52) U.S. Cl.
CPC ............. *F24C 15/022* (2013.01); *A47J 36/00* (2013.01); *E05B 17/00* (2013.01); *E05B 63/18* (2013.01); *E05B 65/0014* (2013.01); *E05B 13/002* (2013.01)

(58) Field of Classification Search
CPC .... E05B 63/0017; E05B 63/18; E05B 63/185; E05B 17/2038; E05B 65/0014; E05B 13/00; E05B 13/002; E05B 17/00; F24C 15/022; E05C 1/06
USPC ................................. 292/149, 150, 155, 251
See application file for complete search history.

(56) References Cited

U.S. PATENT DOCUMENTS

| | | | | |
|---|---|---|---|---|
| 1,361,317 | A | * | 12/1920 | Dulczewski ........ E05B 47/0002 292/144 |
| 4,565,079 | A | * | 1/1986 | Smith ....................... E05C 1/04 70/451 |
| 11,365,559 | B2 | | 6/2022 | Chen |

(Continued)

FOREIGN PATENT DOCUMENTS

CN          110094112 A        8/2019

*Primary Examiner* — Christine M Mills
*Assistant Examiner* — Peter H Watson
(74) *Attorney, Agent, or Firm* — David D. Brush; Westman, Champlin & Koehler, P.A.

(57) ABSTRACT

A locking device and a food processor. The locking device includes a cover plate; an unlocking mechanism including an unlocking key and an unlocking portion connected to the unlocking key. The unlocking portion is disposed in the cover plate and can move in the length direction of the cover plate. A disabling mechanism includes a blocking portion and an actuating portion, wherein the blocking portion can be clamped to the unlocking portion to block the movement of the unlocking portion in the length direction, and the actuating portion is in linkage with the blocking portion in such a mode that the blocking portion moves away from or close to the unlocking portion. After the disabling mechanism is started, a user does not need to press the unlocking key again when needing to open the door.

9 Claims, 6 Drawing Sheets

(56) References Cited

U.S. PATENT DOCUMENTS

| | | |
|---|---|---|
| 2019/0234109 A1 | 8/2019 | Chen |
| 2019/0264925 A1* | 8/2019 | Lin ...................... E05B 1/0038 |
| 2022/0307698 A1* | 9/2022 | Ryu ..................... H05B 6/6414 |
| 2023/0097653 A1* | 3/2023 | Liu ...................... F24C 15/022 |
| | | 219/723 |

* cited by examiner

LOCKING DEVICE AND FOOD PROCESSOR

TECHNICAL FIELD

The present disclosure relates to the field of household appliances, and particularly relates to a locking device and a food processor.

BACKGROUND ART

Household appliances improve people's quality of life, but some of them may be dangerous for children. For example, in the case of food processors which can heat food, children can sometimes get scalded when they take food that is too hot. Therefore, in the prior art, the food processors are equipped with a locking device with a child lock function, the locking device keeps the door of the food processor locked and requires a specific action or condition for opening, so that the children cannot easily open the door, thus ensuring that they are not scalded by food.

In practice, however, some users do not have children in their homes or their children have grown up, so these users do not need the child lock function which makes operation complicated for these users and reduce the use experience of these users. Therefore, how to provide a locking device and a food processor, which can adjust the child lock function according to different situations becomes a problem to be solved.

SUMMARY

In response to the problems that a locking device and a food processor in the prior art make the door opening operation complicated and the use experience poor for users who do not need the child lock function, an exemplary aspect of the present disclosure a locking device, including: a cover plate; an unlocking mechanism including an unlocking key and an unlocking portion connected to the unlocking key, the unlocking portion being disposed in the cover plate and being able to move in the length direction of the cover plate; and a disabling mechanism including a blocking portion and an actuating portion, the blocking portion being able to be clamped to the unlocking portion to block the movement of the unlocking portion in the length direction, and the actuating portion being in linkage with the blocking portion in such a mode that the blocking portion moves away from or close to the unlocking portion.

According to the above-mentioned technical solution, the unlocking portion moves in the length direction of the cover plate, and depending on the different positions to which the unlocking portion moves, the unlocking mechanism can be in a locked/unlocked state. When the unlocking mechanism is in the locked state, the user is unable to complete a door opening action. When the unlocking mechanism is in the unlocked state, the user is able to further perform the door opening action. In this way, two actions are required to open the door, which achieves the child lock function and avoids children's misoperation, thus improving the safety of the locking device.

The disabling mechanism includes the blocking portion and the actuating portion, the actuating portion acts so that the blocking portion can be driven to block the unlocking portion, i.e., the blocking portion prevents the unlocking portion from moving in the length direction, so that the unlocking portion cannot be reset and the unlocking mechanism is kept in a normally unlocked state. Thus, the user does not need to press the unlocking key again when needing to open the door, which improves the convenience of the locking device, and effectively improves the user experience of the users who do not need the child lock function.

In an exemplary embodiment, the disabling mechanism further includes a housing accommodating the blocking portion therein, and a cover body fixedly connected to the housing, the cover body is disposed on the side of the housing close to the unlocking mechanism, an inner periphery of the cover body matches an outer periphery of the blocking portion, and the actuating portion is embedded in the end of the housing away from the unlocking mechanism.

According to the above-mentioned technical solution, the housing accommodates the blocking portion and the actuating portion therein, so that the actuating portion and the blocking portion can be protected. By disposing the cover body fixedly connected to the housing, mounting of internal components of the disabling mechanism can be facilitated.

In an exemplary embodiment, the disabling further includes a rotating rod, one end of the rotating rod is connected to the actuating portion and the other end of the rotating rod is connected to the blocking portion, a second elastic element is disposed between the cover body and the rotating rod, the rotating rod has a protrusion structure, and the rotating rod is configured to be caught in the housing by the protrusion structure when the actuating portion is rotated.

According to the above-mentioned technical solution, the actuating portion is rotated and pressed to drive the rotating rod to rotate, so that the protrusion structure moves to the caught position on the side of the housing close to the unlocking portion, so that the blocking portion keeps the state of blocking the unlocking portion. When the rotating rod rotates so that the protrusion structure moves to the caught position on the side of the housing away from the unlocking portion, the blocking portion stops blocking the unlocking portion.

In an exemplary embodiment, the disabling mechanism further includes a rotary core, one end of the rotary core is connected to the actuating portion and the other end of the rotary core is connected to the blocking portion, a first elastic element is disposed between the cover body and the rotary core, and the rotary core is configured to drive the blocking portion to move by rotation when the actuating portion is pressed.

According to the above-mentioned technical solution, the rotary core is driven to rotate by pressing the actuating portion, and the blocking portion can further be driven to be close to/away from the unlocking portion by the rotation of the rotary core. The first elastic element plays a reset role to provide an elastic force so that the blocking portion can be away from the unlocking portion.

In an exemplary embodiment, a door opening mechanism is further included, the door opening mechanism including a door opening key and a guide post extending from the door opening key, and the unlocking portion forming a first through hole for the guide post to pass through.

According to the above-mentioned technical solution, the unlocking portion has the first through hole, and when the guide post can pass through the first through hole, the door opening mechanism can complete the door opening action; when the guide post cannot pass through the first through hole, the door opening mechanism cannot complete the door opening action. Therefore, the user needs to press the unlocking key to move the first through hole to a position corresponding to the guide post, and then simultaneously presses the door opening key so as to complete the door opening action, which is beneficial for improving the safety of the locking device.

In an exemplary embodiment, the unlocking portion has a main body portion, a guide rod portion extending from the main body portion in a direction away from the unlocking key, and a third elastic element sleeving the guide rod portion and exerting a force on the main body portion in a direction away from the cover plate.

According to the above-mentioned technical solution, the guide rod portion has the function of guiding the movement of the unlocking portion, and the third elastic element sleeving the guide rod portion exerts a force on the main body portion in the direction away from the cover plate, so as to play a reset role, so that the unlocking mechanism can be in the unlocked state.

In an exemplary embodiment, the cover plate has a limiting groove, the unlocking portion further has a limiting protrusion disposed on the main body portion, and the limiting protrusion can move along the limiting groove.

According to the above-mentioned technical solution, the limiting groove plays the roles of guiding and limiting the limiting protrusion, so that the main body portion can move in the range defined by the limiting groove, thereby ensuring that the unlocking portion can move with a specified stroke in the cover plate, avoiding the case where the unlocking portion deviates during the movement, and effectively ensuring the stability of the unlocking mechanism.

In an exemplary embodiment, a blocked portion matching with the blocking portion is disposed on the main body portion.

According to the above-mentioned technical solution, the blocking portion is clamped to the blocked portion so as to prevent further movement of the main body portion. The blocked portion matching with the blocking portion is disposed, which is beneficial for improving the blocking effect of the blocking portion.

In an exemplary embodiment, the cover plate is provided with a second through hole for the guide post to pass through, and the unlocking portion further includes a boss portion formed by extending the main body portion to the side away from the unlocking key, and the boss portion can move along the second through hole.

According to the above-mentioned technical solution, the boss portion protrudes out of the second through hole, so that the second through hole can play the roles of limiting and guiding the boss portion, thereby enabling the unlocking portion to move in the range defined by the second through hole, and improving the stability of the unlocking portion during the movement.

Another exemplary aspect of the present disclosure provides a food processor having the above-mentioned locking device.

According to the above-mentioned technical solution, when the disabling mechanism is not started and the food processor needs to be opened, the unlocking key and the door opening key need to be pressed at the same time so as to open the door, and for families with children, accidental events such as scald caused when children open the food processor by mistake can be avoided, thereby improving the safety of the food processor. In addition, for families without children, by starting the disabling mechanism, the unlocking key is kept in the unlocked state, and the user can open the food processor by pressing the door opening key without pressing the unlocking key, thereby improving the usability of the food processor.

LIST OF REFERENCE NUMERALS

100: locking device; 200: food processor; 1: cover plate; 11: limiting groove; 12: second through hole; 2: unlocking mechanism; 21: unlocking key; 22: unlocking portion; 221: first through hole; 222: main body portion; 223: guide rod portion; 224: limiting protrusion; 225: blocked portion; 226: third elastic element; 227: boss portion; 3: disabling mechanism; 31: blocking portion; 32: actuating portion; 33: housing; 331: first notch; 332: second notch; 34: cover body; 35: rotary core; 351: first rotating portion; 352: second rotating portion; 36: first elastic element; 37: rotating rod; 371: protrusion structure; 38: second elastic element; 4: door opening mechanism; 41: door opening key; 42: guide post; a: length direction.

DETAILED DESCRIPTION

The technical solutions in embodiments of the present disclosure will be clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments in the present disclosure without creative efforts shall fall within the protection scope of the present disclosure.

First Embodiment

Figure 1:
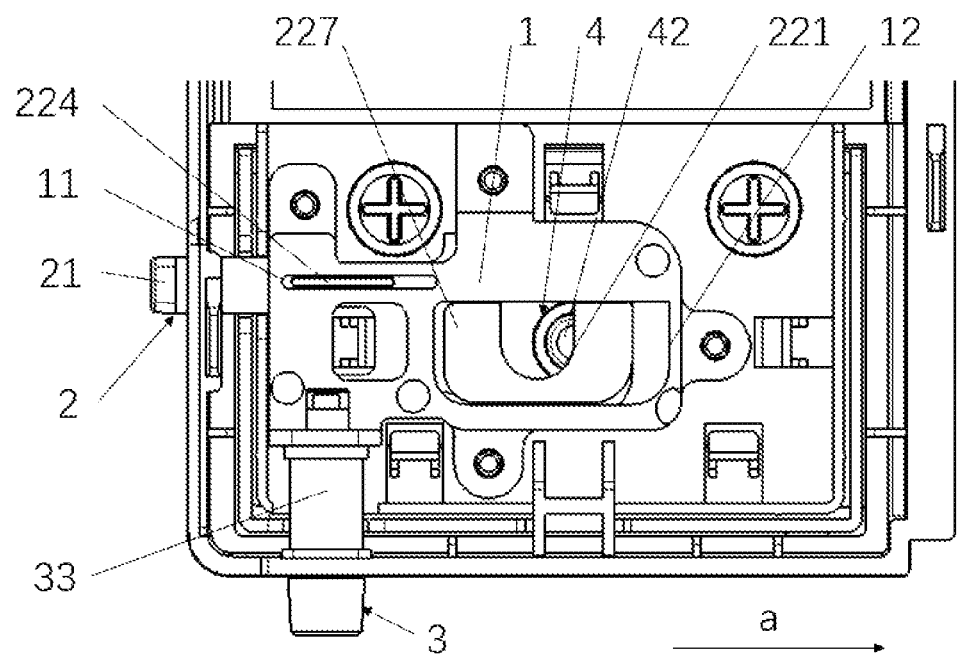
FIG. 1 is a schematic structural view of a locking device according to the first embodiment of the present disclosure.
Figure 4:
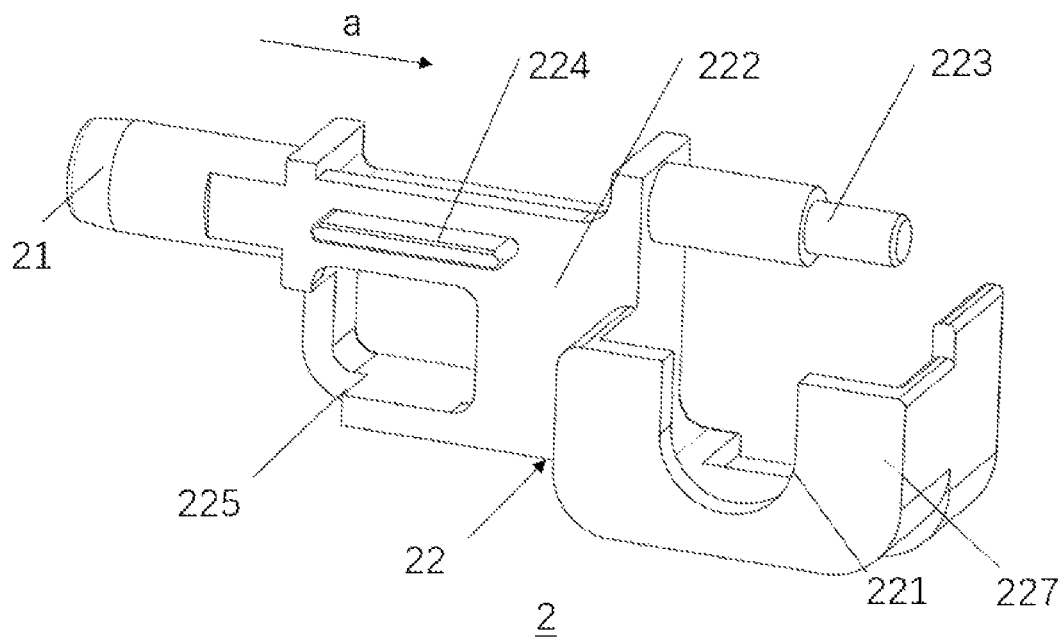
FIG. 4 is a three-dimension view of an unlocking mechanism according to the first embodiment of the present disclosure.

The present embodiment provides a locking device 100, FIG. 1 is a schematic structural view of the locking device 100 according to the first embodiment of the present disclosure, more specifically, FIG. 1 is a structural view of a door of a food processor, and as shown in FIG. 1, the locking device 100 includes a cover plate 1 and an unlocking mechanism 2 matching with the cover plate 1. Referring to FIG. 4 together, in the present embodiment, the unlocking mechanism 2 includes an unlocking key 21 and an unlocking portion 22 connected to the unlocking key 21. The unlocking portion 22 is disposed in the cover plate 1 and can move in the length direction a of the cover plate 1. The locking device 100 further includes a door opening mechanism 4, and the door opening mechanism 4 is a component for completing a door opening action.

Specifically, the door opening mechanism 4 has a door opening key 41 (shown in FIG. 7) and a guide post 42 (shown in FIG. 3) connected to the door opening key 41, wherein the guide post 42 moves in a direction substantially perpendicular to the plane where the unlocking portion 22 is located when the door opening mechanism 4 acts, and the unlocking portion 22 forms a first through hole 221 for the guide post 42 to pass through; and as shown in FIG. 1, when the unlocking key 21 is not pressed, the first through hole 221 of the unlocking portion 22 does not move to a position where the guide post 42 can pass through the first through hole, but blocks the guide post 42, and therefore the guide post 42 cannot pass through the first through hole 221, as a result, the door opening mechanism 4 cannot complete the door opening action, the unlocking mechanism 2 is in a locked state at this moment, and the child lock function of the locking device 100 is realized, which is beneficial for improving the safety of the locking device 100.

Figure 2:
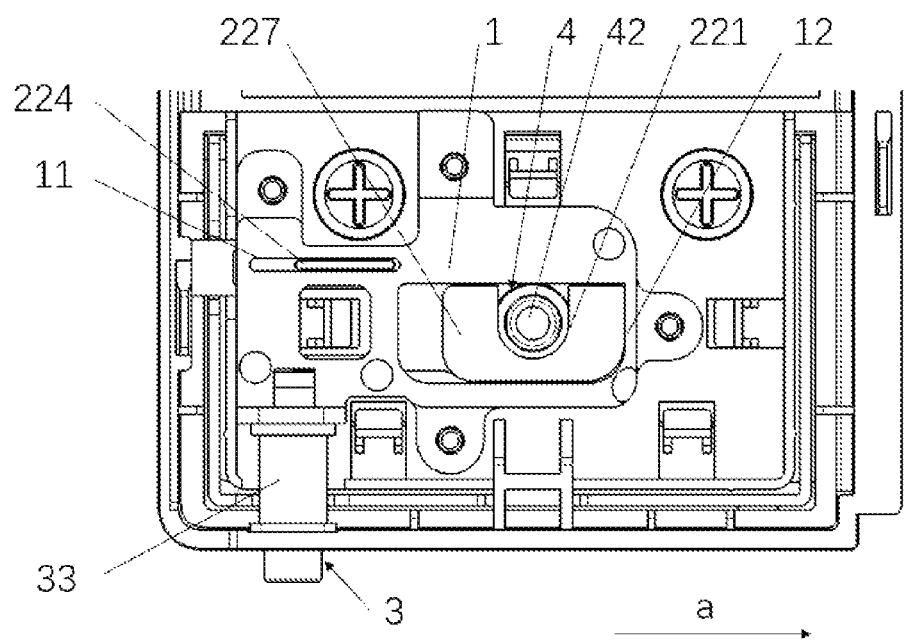
FIG. 2 is another schematic structural view of the locking device according to the first embodiment of the present disclosure.

FIG. 2 is another structural schematic view of the locking device 100 according to the first embodiment of the present disclosure. As shown in FIG. 2, the relationship between the guide post 42 and the first through hole 221 that the guide post cannot pass through the first through hole in FIG. 1 becomes the relationship in FIG. 2 that the guide post 42 can pass through the first through hole, namely, the unlocking mechanism 2 changes from the original locked state to an unlocked state. Specifically, a user presses the unlocking key 21, and the unlocking key 21 drives the unlocking portion 22 to move; and when the unlocking portion 22 moves to a position where the first through hole 221 corresponds to the door opening mechanism 4, the guide post 42 can pass through the first through hole 221, and the door opening key 41 is pressed while keeping pressing the unlocking key 21, so that the door opening mechanism 4 can complete the door opening action.

Figure 3:
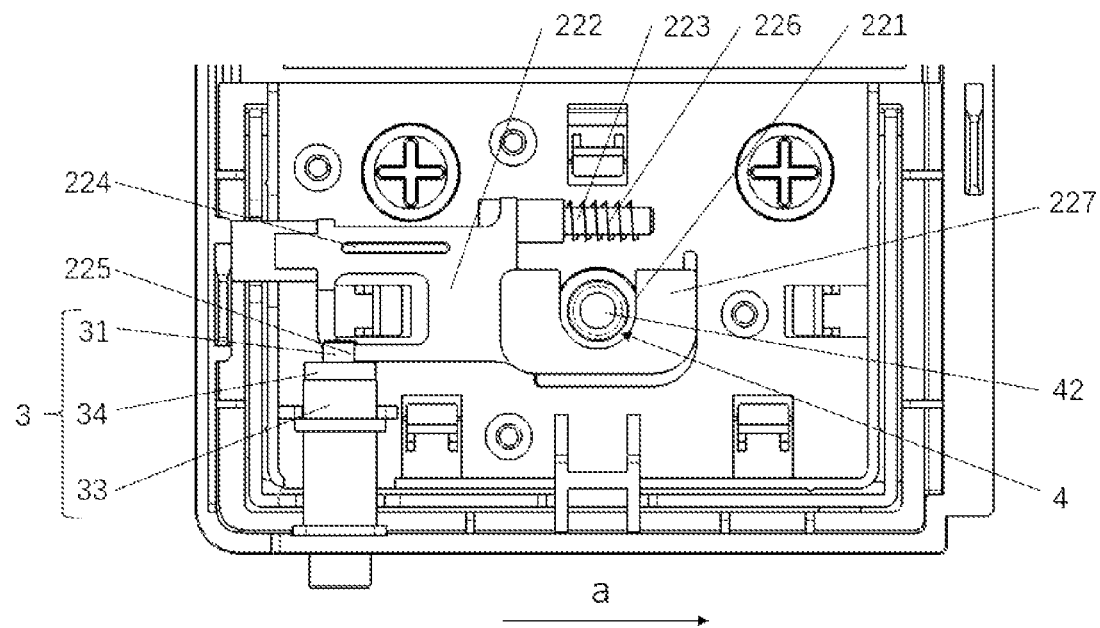
FIG. 3 is an internal view of the locking device according to the first embodiment of the present disclosure.

FIG. 3 is an internal view of the locking device 100 according to the first embodiment of the present disclosure. The cover plate 1 is hidden in FIG. 3 compared with FIG. 2, so as to show the structure and matching relationship inside the locking device 100. As shown in FIG. 3, the locking device 100 further includes a disabling mechanism 3 for keeping the unlocking mechanism 2 in the unlocked state. The disabling mechanism 3 has a blocking portion 31, the blocking portion 31 can be clamped to the unlocking portion 22 so as to prevent the unlocking portion 22 from moving to the side away from the guide post 42, i.e., when the unlocking portion 22 moves to a position where the first through hole 221 corresponds to the door opening mechanism 4, the unlocking portion 22 is kept in this state. The blocking portion 31 obstructs the movement of the unlocking portion 22 in the length direction a of the cover plate 1, thereby making the unlocking mechanism 2 not be able to return to the locked state, so that the locked state fails.

The disabling mechanism 3 further includes a housing 33 accommodating the blocking portion 31 therein, and a cover body 34 fixedly connected to the housing 33, the cover body 34 is disposed on the side of housing 33 close to the unlocking mechanism 2, and an inner periphery of the cover body 34 matches an outer periphery of the blocking portion 31. The cover body 34 is disposed and can play a role of facilitating assembling, various components in the disabling mechanism 3 are mounted in the housing 33 from the position where the cover body 34 is located, and after the components are mounted, the cover body 34 and the housing 33 are fixedly connected.

The following is a detailed description of the specific structure of the unlocking mechanism 2, and FIG. 4 is a three-dimension diagram of the unlocking mechanism 2 according to the first embodiment of the present disclosure. As shown in FIG. 1 and FIG. 4, the cover plate 1 mainly plays the roles of limiting and guiding the unlocking mechanism 2. Specifically, the cover plate 1 has a limiting groove 11, the unlocking portion 22 is provided with a limiting protrusion 224 corresponding to the limiting groove 11, and the limiting protrusion 224 can move along the limiting groove 11. The limiting groove 11 plays the roles of guiding and limiting the limiting protrusion 224 so that the unlocking portion 22 can move in the range defined by the limiting groove 11. The unlocking portion 22 has a main body portion 222, a guide rod portion 223 extending from the main body portion 222 in a direction away from the unlocking key 21, and a third elastic element 226 (shown in FIG. 3) sleeving the guide rod portion 223 and exerting a force on the main body portion 222 in a direction away from the cover plate 1.

The third elastic element 226 applies a force to the main body portion 222 in a direction away from the guide post 42, and when the disabling mechanism 3 is not blocked, the unlocking portion 22 receives the elastic force of the third elastic element 226, and once the user stops pressing the unlocking key 21, the unlocking portion 22 returns to the locked state due to the elastic force of the third elastic element 226. The unlocking mechanism 2 can return to the locked state by itself, so that the unlocking mechanism 2 maintains a normally locked state when the disabling mechanism 3 does not act, thereby improving the safety of the locking device 100.

A blocked portion 225 matching with the blocking portion 31 is disposed on the main body portion 222, and the blocking portion 31 can be caught at the blocked portion 225, thereby preventing further movement of the main body portion 222. The blocked portion 225 matching with the blocking portion 31 is disposed, which is beneficial for improving the blocking effect of the blocking portion 31.

In the present embodiment, the unlocking portion 22 further includes a boss portion 227 formed by extending the main body portion 222 to the side away from the unlocking key 21, and corresponding thereto, a second through hole 12 is formed in the cover plate 1. The boss portion 227 is clamped in the second through hole 12 and stretches out from the second through hole 12 in a direction away from the door. The first through hole 221 is a U-shaped opening formed at the boss portion 227. The U-shaped opening remains a greater allowance for the guide post 42 to pass through, avoiding the situation where due to the fact that the guide post 42 is stuck in the first through hole 221, the door cannot be opened, and improving the stability of the locking device 100.

The guide post 42 needs to pass through the second through hole 12 and the first through hole 221 so as to complete the door opening action. Since the boss portion 227 can move along the second through hole 12, the boss portion 227 protrudes out of the second through hole 12, so that the second through hole 12 can play the roles of limiting and guiding the boss portion 227, thereby enabling the unlocking portion 22 to move in the range defined by the second through hole 12, and improving the stability of the unlocking portion 22 during the movement.

Figure 5:
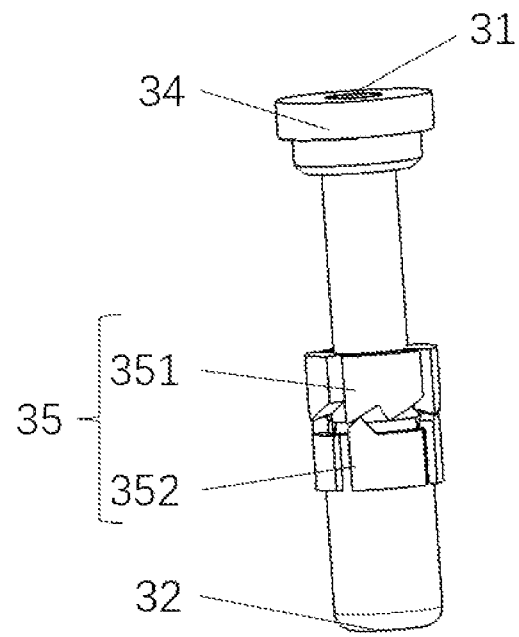
FIG. 5 is an internal view of a disabling mechanism according to the first embodiment of the present disclosure.

The following is a detailed description of the specific structure of the disabling mechanism 3. FIG. 5 is an internal view of the disabling mechanism 3 according to the first embodiment of the present disclosure. As shown in FIG. 5, the disabling mechanism 3 further includes an actuating portion 32, wherein the actuating portion 32 is in linkage with the blocking portion 31 in such a mode that the blocking portion 31 is away from or close to the unlocking portion 22, and the actuating portion 32 is embedded in the end of the housing 33 away from the unlocking mechanism 2.

Further, the disabling mechanism 3 further includes a rotary core 35, wherein the rotary core 35 includes a first rotating portion 351 and a second rotating portion 352 matching with each other, and the first rotating portion 351 and the second rotating portion 352 can convert a linear motion between each other into a rotary motion. The first rotating portion 351 is connected to the actuating portion 32, and the second rotating portion 352 is connected to the blocking portion 31. The rotary core 35 is configured to rotate to driven the blocking portion 31 to move when the actuating portion 32 is pressed.

Figure 6:
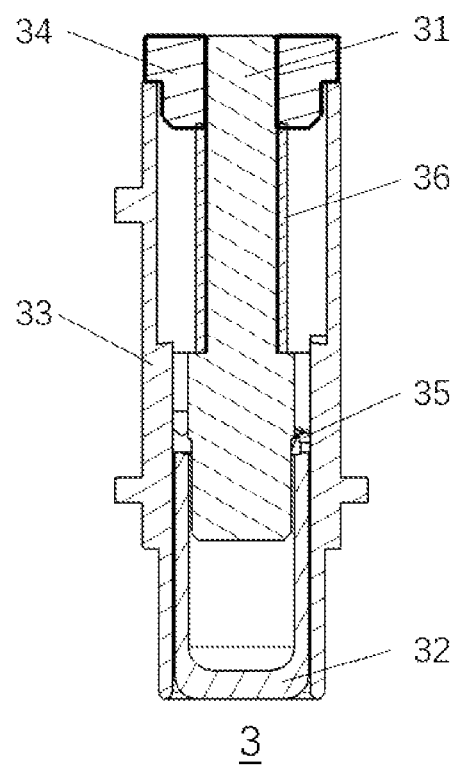
FIG. 6 is a cross-sectional view of the disabling mechanism according to the first embodiment of the present disclosure.

FIG. 6 is a cross-sectional view of the disabling mechanism 3 according to the first embodiment of the present disclosure. As shown in FIG. 6, the actuating portion 32 is pressed to drive the first rotating portion 351 to move linearly, thereby enabling the first rotating portion 351 and the second rotating portion 352 to rotate relatively, and the second rotating portion 352 moves to a position close to the unlocking portion 22, so that the blocking portion 31 keeps the state of blocking the unlocking portion 22. A first elastic element 36 is disposed between the cover body 34 and the rotary core 35, and the first elastic element 36 plays a reset role to provide an elastic force when the actuating portion 32 is not pressed, so that the second rotating portion 352 is reset and the blocking portion 31 is out of contact with the unlocking portion 22.

Figure 7:
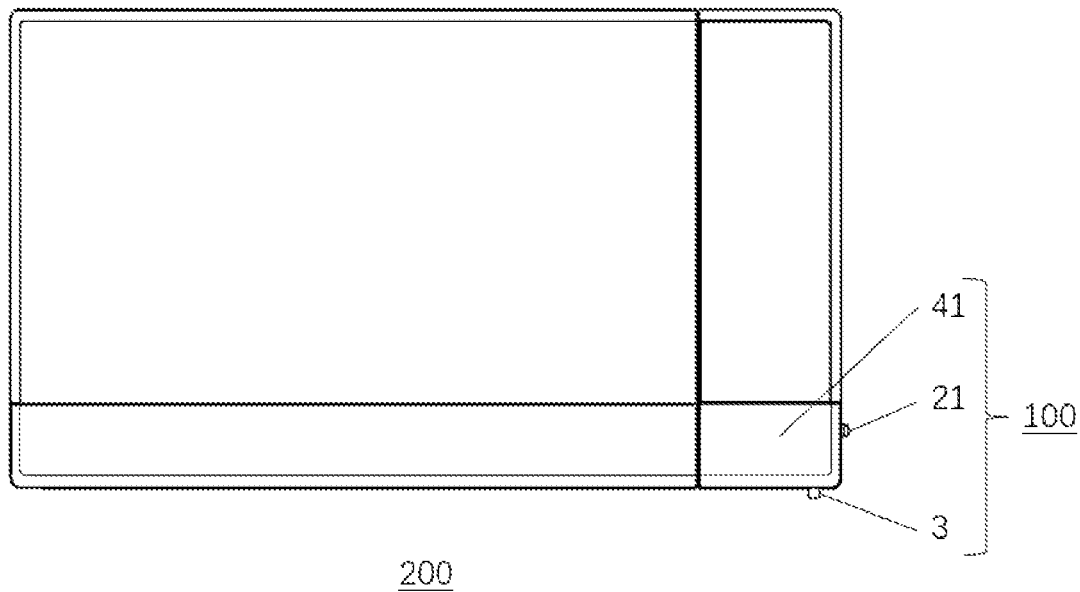
FIG. 7 is a front view of a food processor according to the first embodiment of the present disclosure.

FIG. 7 is a front view of a food processor 200 according to the first embodiment of the present disclosure. As shown in FIG. 7, in the present embodiment, the locking device 100 is applied to the food processor 200. When the disabling mechanism 3 does not block the unlocking portion 22, the user needs to press the unlocking key 21 and the door opening key 41 from both directions at the same time to be able to open the door body of the food processor 200. For a user who has a child at home, it is possible to prevent the situation that the child opens the door body of the food processor 200 by mistake, and then is scalded, thereby improving the safety of the food processor 200. In addition, for families without children, by the disabling mechanism 3, the unlocking mechanism 2 is kept in the unlocked state, and the user can open the door body of the food processor 200 by directly pressing the door opening key 41 without pressing the unlocking key 21, thereby improving the usability of the food processor 200. In some other embodiments of the present disclosure, the locking device 100 can also be applied to other products, which is not specifically limited herein.

Second Embodiment

Figure 8:
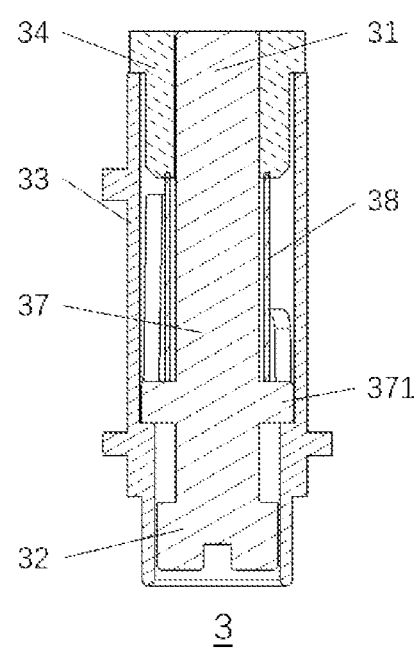
FIG. 8 is a cross-sectional view of a disabling mechanism according to a second embodiment of the present disclosure.

The present embodiment further provides a locking device 100, and the locking device 100 in the present embodiment differs from that in the first embodiment in the different structure of a disabling mechanism 3. FIG. 8 is a cross-sectional view of the disabling mechanism 3 according to the second embodiment of the present disclosure. As shown in FIG. 8, in the present embodiment, the disabling mechanism 3 includes a rotating rod 37, one end of the rotating rod 37 is connected to the actuating portion 32 and the other end of the rotating rod 37 is connected to the blocking portion 31, and a second elastic element 38 is disposed between the cover body 34 and the rotating rod 37.

In the present embodiment, the blocking portion 31, the rotating rod 37, and the actuating portion 32 are integrally formed to facilitate machining, manufacturing and mounting. In some other embodiments of the present disclosure, the blocking portion 31, the rotating rod 37 and the actuating portion 32 may also be separately manufactured and then fixedly connected together, which is not specifically limited herein.

Figure 9:
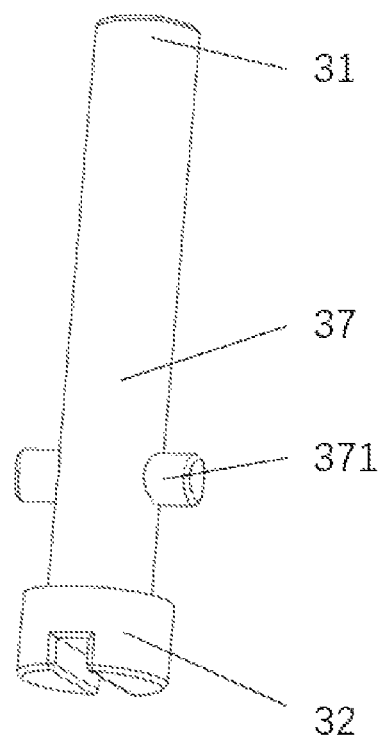
FIG. 9 is a three-dimension view of a rotating rod, an actuating portion and a blocking portion according to the second embodiment of the present disclosure.

FIG. 9 is a three-dimensional view of the rotating rod 37, the actuating portion 32 and the blocking portion 31 according to the second embodiment of the present disclosure. As shown in FIG. 9, the rotating rod 37 has two protrusion structures 371, and the two protrusion structures 371 are symmetrical with the rotating rod 37 as the center. The rotating rod 37 is configured to be caught in the housing 33 by the protrusion structure 371 when the actuating portion 32 is rotated.

In the present embodiment, the actuating portion 32 has a "linear" groove, and a user can use, for example, a screwdriver to extend into the disabling mechanism 3, and after a screwdriver bit matches with the "linear" groove, the screwdriver is rotated and a force is applied to the actuating portion 32, so that the actuating portion 32 can drive the rotating rod 37 to act. In some other embodiments of the present disclosure, the actuating portion 32 is not limited to the "linear" groove, and may also have other shapes and structures, which are not specifically limited herein.

Figure 10:
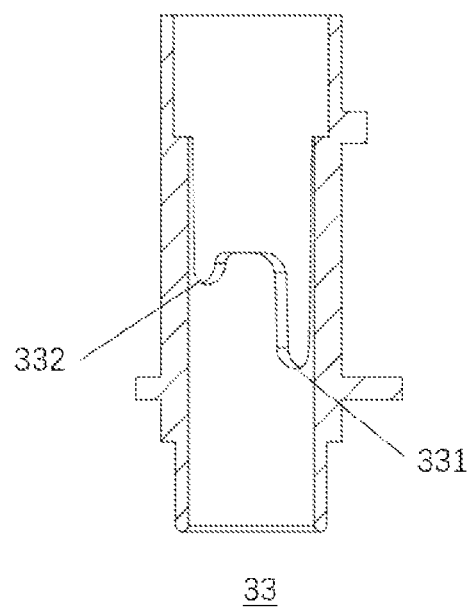
FIG. 10 is a cross-sectional view of a housing according to the second embodiment of the present disclosure.

FIG. 10 is a cross-sectional view of the housing 33 according to the second embodiment of the present disclosure, as shown in FIG. 10, further, an inner periphery of the housing 33 forms first notches 331 away from an unlocking portion 22 and second notches 332 close to the unlocking portion 22, both the first notch 331 and the second notch 332 being able to be clamped to the protrusion structure 371. In the present embodiment, the housing 33 forms two first notches 331 and two second notches 332 to match with the two protrusion structures 371.

Figure 11:
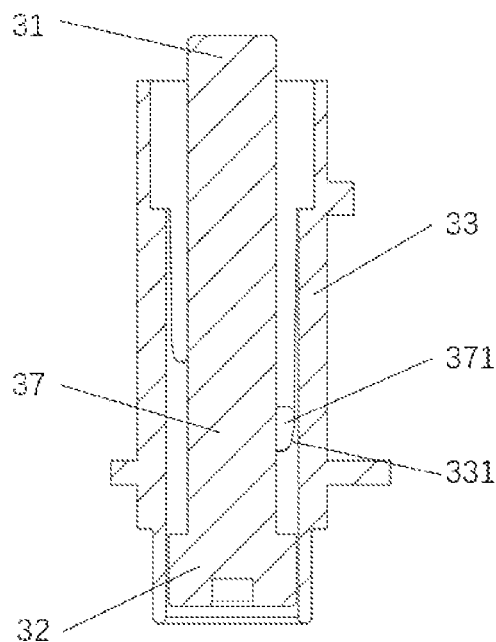
FIG. 11 is a cross-sectional view of the housing and the rotating rod according to the second embodiment of the present disclosure.
Figure 12:
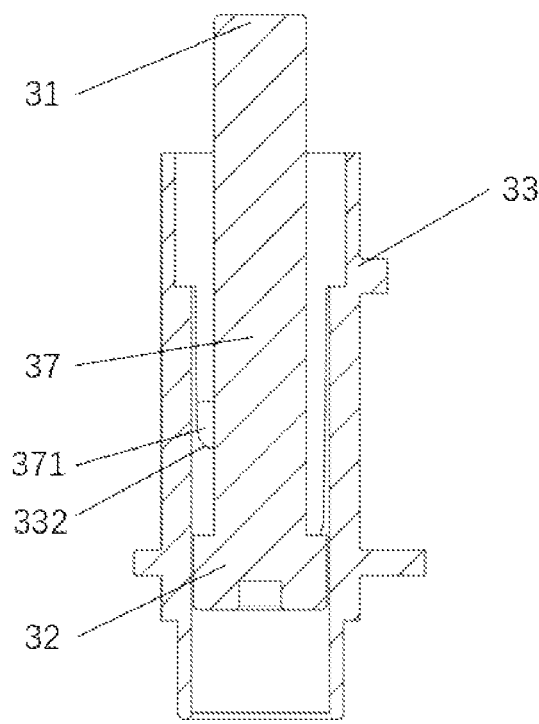
FIG. 12 is another cross-sectional view of the housing and the rotating rod according to the second embodiment of the present disclosure.

FIG. 11 is a cross-sectional view of the disabling mechanism 3 according to the second embodiment of the present disclosure, and FIG. 12 is another cross-sectional view of the disabling mechanism 3 according to the second embodiment of the present disclosure. The cover body 34 is not shown in any of the disabling mechanisms 3 of FIGS. 11 and 12 . . . . The protrusion structure 371 in FIG. 11 is located at a position clamped to the first notch 331, and the protrusion structure 371 in FIG. 12 is located at a position clamped to the second notch 332.

As shown in FIGS. 11 and 12, the first notch 331 and the second notch 332 are distributed along the inner periphery of the housing 33 at an interval of 90 degrees, and when the actuating portion 32 is pressed and simultaneously rotated by 90 degrees, the protrusion structure 371 is driven to move from the first notch 331 to the second notch 332, and the rotating rod 37 receives the elastic force of the second elastic element 38, so that the protrusion structure 371 is kept to be tightly clamped to the second notch 332. Since the second notch 332 is close to the unlocking portion 22, the blocking portion 31 keeps a state of blocking the unlocking portion 22.

Similarly, by pressing and rotating the actuating portion 32 by 90 degrees, the protrusion structure 371 is driven to move away from the second notch 332, and the second elastic element 38 provides an elastic force to move the rotating rod 37 in a direction away from the unlocking portion 22, thereby driving the blocking portion 31 to be out of the state of blocking the unlocking portion 22.

It will be appreciated by those skilled in the art that specific technical features in the various embodiments may be adaptively split or combined. Such division or combination of specific technical features does not cause the technical solution to deviate from the principle of the present disclosure, and therefore the technical solution after division or combination falls within the protection scope of the present disclosure. In the description of the present application, "a plurality of" means two or two or more, unless it is specifically defined otherwise.

The description provides only exemplary embodiments of the present disclosure and is not intended to limit the present disclosure. Any modification, equivalent replacement, or improvement made within the spirit and principle of the present disclosure shall fall within the protection scope of the present disclosure.

The invention claimed is:

1. A locking device, comprising:
a cover plate having a length direction;
an unlocking mechanism comprising an unlocking button and an unlocking portion connected to the unlocking button, the unlocking portion being disposed behind the cover plate and configured to move linearly in the length direction of the cover plate upon depression of the unlocking button in the length direction;
a disabling mechanism comprising a blocking portion and an actuating portion, the blocking portion being able to be engaged with the unlocking portion to block the movement of the unlocking portion in the length direction, and the actuating portion being in linkage with the blocking portion in such a mode that the blocking portion moves away from or close to the unlocking portion, wherein the actuating portion is movable linearly in an actuation direction that is substantially perpendicular to the length direction; and
a door opening mechanism comprising a guide post, and the unlocking portion comprising a first through hole configured for passage of the guide post.

2. The locking device according to claim 1, wherein the disabling mechanism further comprises a housing accommodating the blocking portion therein, and a cover body fixedly connected to the housing, the cover body is disposed on the side of the housing close to the unlocking mechanism, an inner periphery of the cover body matches an outer periphery of the blocking portion, and the actuating portion is embedded in the end of the housing away from the unlocking mechanism.

3. The locking device according to claim 2, wherein the disabling further comprises a rotating rod, one end of the rotating rod is connected to the actuating portion and the other end of the rotating rod is connected to the blocking portion, a second elastic element is disposed between the cover body and the rotating rod, the rotating rod has a protrusion structure, and the rotating rod is configured to be caught in the housing by the protrusion structure when the actuating portion is rotated.

4. The locking device according to claim 1, wherein the door opening mechanism comprises a door opening button connected to the guide post.

5. The locking device according to claim 4, wherein the unlocking portion having a main body portion, a guide rod portion extending from the main body portion in a direction away from the unlocking button, and a third elastic element sleeving the guide rod portion and exerting a force on the main body portion in a direction away from the cover plate.

6. The locking device according to claim 5, wherein the cover plate has a limiting groove, the unlocking portion further has a limiting protrusion disposed on the main body portion, and the limiting protrusion can move along the limiting groove.

7. The locking device according to claim 6, wherein the cover plate is provided with a second through hole for the guide post to pass through, the unlocking portion further comprises a boss portion formed by extending the main body portion to the side away from the unlocking button, and the boss portion can move along the second through hole.

8. The locking device according to claim 5, wherein a blocked portion matching with the blocking portion is disposed on the main body portion.

9. A food processor comprising:
a locking device comprising:
a cover plate having a length direction;
an unlocking mechanism comprising an unlocking button and an unlocking portion connected to the unlocking button, the unlocking portion being disposed in the cover plate and being able to move in a length direction of the cover plate;
a disabling mechanism comprising a blocking portion and an actuating portion, the blocking portion being able to be engaged with the unlocking portion to block the movement of the unlocking portion in the length direction, and the actuating portion being in linkage with the blocking portion in such a mode that the blocking portion moves away from or close to the unlocking portion, wherein the actuating portion is configured to move linearly in an actuation direction that is substantially perpendicular to the length direction; and
a door opening mechanism comprising a guide post, and the unlocking portion comprising a first through hole configured for passage of the guide post.

* * * * *